350-377 SR
XR 3,680,065

United States Patent [15] 3,680,065
Almasi et al. [45] July 25, 1972

[54] NONVOLATILE MAGNETO-OPTICAL MEMORY ELEMENT AND A METHOD OF WRITING THEREON

[72] Inventors: George S. Almasi, Purdy Station; Eugene R. Genovese, Yorktown Heights, both of N.Y.

[73] Assignee: International Business Machines Corporation, Armonk, N.Y.

[22] Filed: May 25, 1970

[21] Appl. No.: 40,234

[52] U.S. Cl. ............340/174 YC, 340/174 QA, 340/174 PC, 350/151

[51] Int. Cl. ........................................................G11c 11/14

[58] Field of Search ...............340/174 YC, 174 PC, 174 QA, 340/174.1 MO; 350/151

[56] References Cited

UNITED STATES PATENTS 3,475,738 10/1969 Louis et al.........................340/174 R

*Primary Examiner*—Stanley M. Urynowicz, Jr.
*Attorney*—Hanifin and Jancin and Hansel L. McGee

[57] ABSTRACT

A magneto-optical memory element for use as a light beam addressable memory element is formed of permalloy and europium oxide films arranged in adjoining layers. Information is written into the permalloy layer while the device is at room temperature. The ambient temperature is then reduced below the Curie point of europium oxide causing the magnetization of the permalloy layer to be directly transferred by negative or anti-parallel exchange coupling to the europium oxide layer. The europium oxide then preserves the stored information in a form suitable for optical read-out which will take place at this low temperature. The device has the advantage that if the ambient temperature accidentally should rise above the Curie point of europium oxide going even as high as room temperature, the stored information will be preserved in the permalloy film until the temperature again is brought below the Curie point of europium oxide. Whereupon the europium oxide film is restored to its previous magnetic state by negative exchange coupling. Thus, the subject magneto-optical memory device is nonvolatile under fluctuating temperature conditions.

6 Claims, 10 Drawing Figures

3680065
OR IN 365/122

INVENTORS
GEORGE S. ALMASI
EUGENE R. GENOVESE

BY Hansel L. McGee
ATTORNEY

NONVOLATILE MAGNETO-OPTICAL MEMORY ELEMENT AND A METHOD OF WRITING THEREON

BACKGROUND OF THE INVENTION

1. Field of the Invention

This invention relates to magneto-optical stored devices such as may be employed in light beam addressable memories and which are nonvolatile under fluctuating temperature conditions.

At the present time a great deal of attention is being given to the development of memory systems wherein data can be stored magnetically and read out optically. In an apparatus of this type, a magneto-optical medium is selectively magnetized at various points therein to represent stored data and during read-out operations selected portions of this medium are impinged or addressed by linearly polarized light beam. If any portion of the medium addressed by such a light beam is locally magnetized in a particular manner, the polarization plane of the light beam will undergo an angular shift or rotation indicative of the stored data represented by such local magnetization. These polarization shifts are detected to send signals corresponding to the stored data.

As employed herein the term "magneto-optical medium" denotes a magnetic material which when magnetized has the ability to change the polarization state of transmitted or reflected light as the function of its magnetization. To be ideally suited for use in a system where data is to be stored magnetically and read-out optically, a magneto-optical medium should have certain desirable properties not all of which can be in one material at the present time. For magnetic storage purposes, an ideal magneto-optical medium should have high remanent magnetization, fairly low coercivity, (1 or 2 Oe for some applications; in the order of 100 Oe for others), a high ratio of remanent flux density to saturation flux density (square loop hysteresis characteristic), and low creep tendencies. For good optical read-out properties the magneto-optical medium should be able to impart a significant angular shift to the polarization plane of the light beam (sufficient to be detected by practical means) without requiring unduly large magnetization. If the Faraday effect is to be utilized, the medium should be transparent to the polarized light beam. In many instances, the Faraday effect is preferred because it produces greater rotation than can be obtained by the Kerr effect. Additionally since the materials presently used as the magneto-optical medium have Curie temperatures of the order of 70° K it is necessary to operate at cryogenic temperatures. That is, at temperatures below the Curie temperature of the specific material. If the temperature rises above the Curie temperature of the magneto-optical medium which has stored information therein, the medium becomes demagnetized and the stored information is thereby lost. Thus, there is the further requirement that the medium be nonvolatile under fluctuating temperature conditions, e.g., the stored information should be available even when the ambient temperature is above the Curie point of the medium.

2. Description of the Prior Art

U. S. Pat. No. 3,475,738 to H. P. Louis and F. Methfessel entitled "Magneto-optical Data Storage" describes a magneto-optic storage device utilizing a europium oxide-permalloy sandwich-type memory element. The patent teaches that writing must be performed only when the ambient temperature is below the Curie temperature of europium oxide and under such conditions that the magnetization vectors of the permalloy and europium oxide layers point in the same direction, that is, positive exchange coupling exist between the two layers, shown in FIG. 6 of the patent. As described, the magneto-optical element is volatile because of the low temperature writing requirement. For as the temperature rises above the Curie point of europium oxide, the information stored therein will be lost, as will be discussed later in more detail.

An article in the Japanese Journal of Applied Physics, Volume 7, 1968, page 555 describes the existence of negative exchange coupling between layers of gadolinium and permalloy but does not suggest the use of such layers in a magneto-optical memory device. Further, gadolinium is magnetically harder than permalloy and it has a Curie point at room temperature. Neither metallic gadolinium nor permalloy is transparent enough to be a suitable magneto-optic medium.

The IBM Technical Disclosure Bulletin abstract of K. Y. Ahn, published November 1968 at page 613 shows what is called a composite film Curie temperature keeper comprising alternate layers of doped europium oxide and gadolinium arranged as a magneto-optical memory device. The article does not specify the type of magnetic coupling between these layers. It also implies some stringent limitations on relative thickness of these layers which is not true of the present device.

In co-pending patent application, Ser. No. 668,289 now U.S. Pat. No. 3,539,382 by Kie Y. Ahn, et al., "Film of Magneto-Optical Rare Earth Oxide Including a Method Therefor and Beam Addressable Memory Therewith" filed on Sept. 8, 1967 and assigned to the assignee hereof, there is presented data on the effect of a rare earth sesquioxide inclusion in thin film europium oxide on the ferromagnetic Curie temperature. Illustratively the ferromagnetic transition temperature of europium films is described as being increased from 69° K to about 140° K.

In co-pending patent application Ser. No. 876,404 by Kie Y. Ahn, "Transition Metal Doped Europium Films, A Method of Preparing Same and Beam Addressable Memory Therewith," filed on Nov. 13, 1969 and assigned to the assignee hereof, there is presented data on the effect of a inner-transition metal inclusion in thin film europium oxide on the ferromagnetic Curie temperature. None of the above-mentioned patent applications describe or suggest a magneto-optical medium which is nonvolatile.

SUMMARY OF THE INVENTION

This invention is directed to the discovery that a magneto-optic memory element formed by having a permalloy and europium oxide film arranged in adjoining layers will enable one to write information into the permalloy layer while the device is at room temperature under which condition the europium oxide film is paramagnetic and is coupled to the permalloy by stray field or anti-parallel coupling. The ambient temperature can be reduced below the Curie temperature of europium oxide thereby causing the magnetization of the permalloy layer to be directly transferred by negative or anti-parallel exchange coupling to the europium oxide layer which now has become ferromagnetic. The europium oxide film then preserves the stored information in a form suitable for optical read-out, which will take place at a low temperature. The memory element can be used in a beam addressable memory device which may be subjected to fluctuating temperatures by which the memory element will not be affected. The device has the advantage that in the event the ambient temperature accidentally should rise above the Curie temperature of the europium oxide, the stored information will be preserved in the permalloy film until the temperature again is brought below the Curie point of europium oxide whereupon the europium oxide is restored to its previous magnetic state by negative exchange coupling. Thus, the magneto-optic memory device is nonvolatile under fluctuating temperature conditions. It should be noted that while the information is stored in the permalloy film at temperatures above the Curie point of EuO, one cannot read information therefrom due to the low Faraday rotation obtained from the thin permalloy films.

OBJECTS OF THE INVENTION

It is, therefore an object of this invention to provide a magneto-optic memory device which is nonvolatile under fluctuating temperature conditions.

It is another object of this invention to provide a magneto-optical memory element having magnetic films which are coupled to each other by negative exchange coupling.

Another object of this invention is to provide a magneto-optical memory element upon which information may be written at room temperature and read at a temperature below the Curie point of one of said films.

BRIEF DESCRIPTION OF THE DRAWINGS

Referring to FIG. 1 where there is shown a simplified light beam addressable memory system in which the present invention is embodied. The magneto-optical storage apparatus is generally designated 10 in this figure. The apparatus 10 comprises (See FIG. 2) a 2 layered magneto-optical storage medium including a data storage layer 12 and a magneto-optical layer 14 supported on a substrate 16. The storage layer 12 is a film of ferromagnetic material, preferably a nickel-iron alloy (permalloy) which has a light reflecting surface. The light reflecting surface of the storage layer 12 is covered by the transparent magneto-optical layer 14, the properties of which will be described hereinafter. Associated with the magneto-optical storage apparatus is a laser or an electron beam source 18 which provides focus beam 20 to the upper surface of apparatus 10. A magnetic field force supplied by helmholtz coils 22 and 24 establishes a magnetic field 26 in the plane of the film 14 in region 28 thereof. Normally in the writing operation, the magneto-optical medium is heated with a laser beam in the presence of a magnetic field of about 40 Oe to about 120 Oe. However, in the present invention, because the writing operation can be performed at room temperature a field of only 5 Oe is required. Before proceeding further with the description of the system shown in FIG. 1, the magneto-optical storage apparatus will now be described in more detail.

In accordance with the present invention, the magneto-optical medium 14 is formed of a transparent ferromagnetic semiconductor that is capable when magnetized of imparting a certain angular displacement or rotation to polarization plane of a linearly polarized light beam 20 transmitted through it. The layer 14 may be composed, for example, of a rare earth chalcogenide such as, europium oxide (EuO), europium sulfide (EuS), europium selenide (EuSe) or europium telluride (EuTe). The layer may also be composed of a rare earth chalcogenide doped with a rare earth sesquioxide or with iron as is disclosed in U. S. Pat. application Ser. No. 668,289 to Kie Y. Ahn, et al. entitled "Film of Magneto-Optical Rare Earth Oxide Including Method Therefor And Beam Addressable Memory Therewith," filed on Sept. 8, 1967 and U.S. Pat. Ser. No. 876,404 to Kie Y. Ahn, entitled "Transition Metal Doped Europium Oxide Films a Method of Preparing The Same and Beam Addressable Memory Therewith Respectively." The medium 14 must of course be maintained at a temperature below its Curie point in order to exhibit film magnetic properties.

The magneto-optical memory apparatus 10 can be prepared as follows:

A nickel-iron composition having the formula $Ni_{80}Fe_{20}$ or a composition having the formula $Ni_{79}Fe_{18}Co_3$ was vacuum deposited onto a heated glass or quartz substrate at a pressure range of 1 to 3 × $10^{-6}$ torr. The substrate is heated to about 100° C at a typical evaporation rate of about 5A./sec. Immediately following the deposition of the permalloy film, europium oxide is evaporated using an electron beam gun in the pressure range of from about 2 to about 5 × $10^{-6}$ torr at a typical evaporation rate of about 8A./sec. The composite films are then covered with a thin (385A.) film of $Eu_2O_3$ to protect the surface from the action with air. The permalloy film has a thickness of about 435A. whereas the europium oxide film or a doped europium oxide film has a thickness in the range of about 350A. to about 1,400A.

Figure 3:
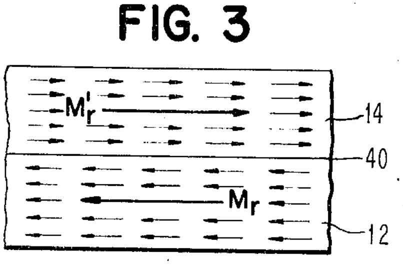
FIG. 3 is a fragmentary sectional view of a magneto-optical data storage device comprising a transparent ferromagnetic semiconducting material in negatively exchange coupled relation to a ferromagnetic metallic storage medium in accordance with the principle of the invention.
Figure 4:
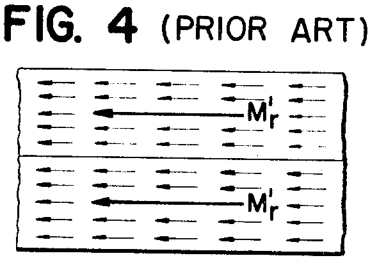
FIG. 4 (PRIOR ART)
FIG. 4 is a fragmentary sectional view of a prior magneto-optical device comprising a layer of transparent ferromagnetic semiconducting material in positively exchanged coupled relation to a ferromagnetic storage medium.

This invention is based upon the discovery that the magnetic moments of the magneto-optic medium 14 and the magnetic moment of storage layer 12 tend to be anti-parallel as a result of negative exchange coupling therebetween, as shown more clearly in FIG. 3, the storage medium 12 (which may be a permalloy film, for example) has a light reflecting surface 40 on which is disposed the layer 14 of magneto-optical material. The relationship between the two layers 12 and 14 is sufficiently intimate so that a remanent magnetization vector $M_R$ directed parallel to the surface 40 and any part of the storage medium 12, induces by negative exchange coupling an opposed magnetization $M'_R$ in the adjacent portion of the magneto-optical medium 14; these two magnetic vectors $M_R$ and $M'_R$ pointing in the opposite direction parallel with the reflecting surface 40. The relationship of the layers 12 and 14 are antithetical to that of the device disclosed in U. S. Pat. No. 3,475,738 to H. P. Louis, et al, where parallel or positive exchange coupling between the layers are disclosed (See FIG. 4). The effect of having anti-parallel or negative exchange coupling between the layers 12 and 14 provides a condition which permits information to be recorded in the Permalloy layer 12 at or about room temperature or at a temperature above the Curie point of the magneto-optical medium under which condition the magneto-optical medium is paramagnetic and is coupled to the permalloy by stray field anti-parallel coupling as in FIG. 5. The ambient temperature is then reduced below the Curie point of the magneto-optical medium causing the magnetization of the permalloy layer to be directly transferred by negative or anti-parallel exchange coupling to the magneto-optical medium 14 which now has become ferromagnetic. The magneto-optical medium 14 then preserves the stored information in a form suitable for optical read out which will take place at this low temperature. The device of this invention has the advantage in that if the ambient temperature accidentally should rise above the Curie point of the magneto-optical medium 14 going even as high as room temperature, the stored information will be preserved in the permalloy film until the temperature again is brought below the Curie point of the magneto-optical medium 14, whereupon the medium 14 is restored to its previous magnetic state.

Figures 5, 9:
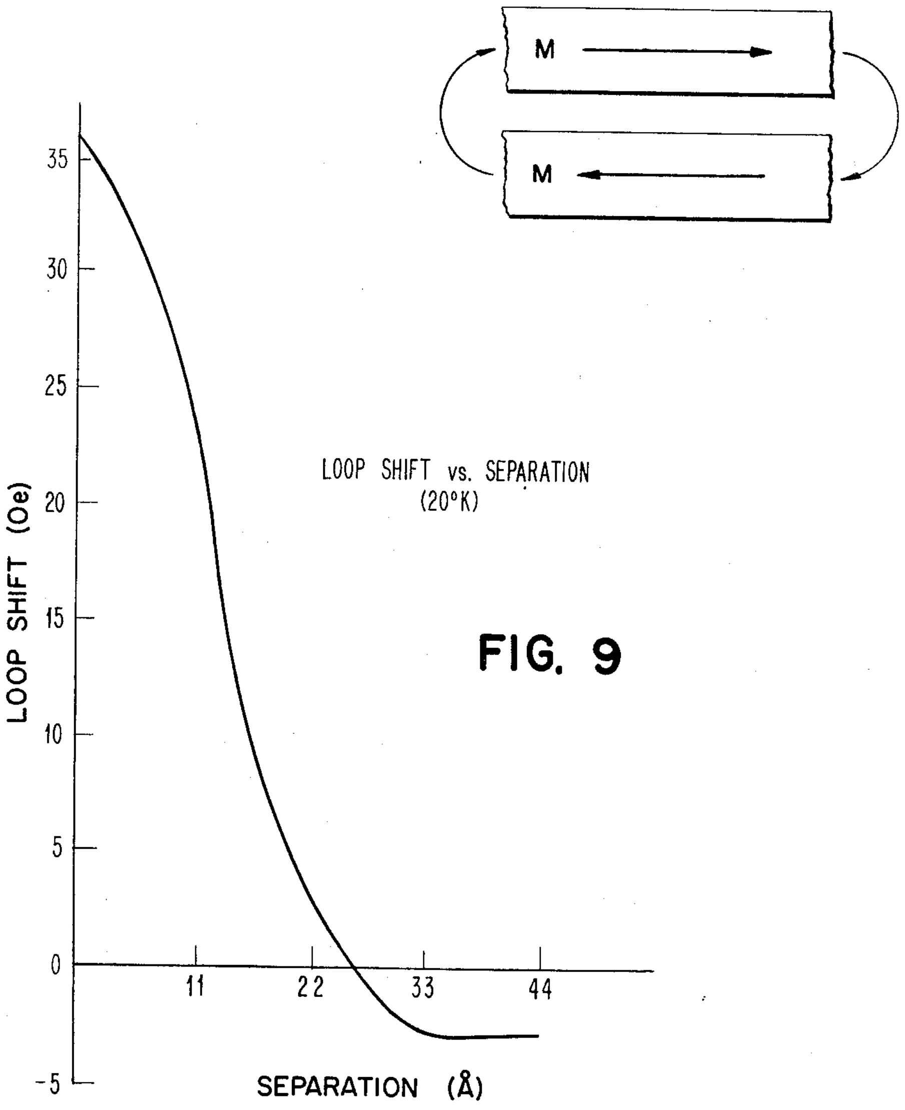
FIG. 5 is a fragmentary sectional view of a device illustrating the effect of magnetostatic couple relation between a paramagnetic and a ferromagnetic material or between two ferromagnetic materials.
FIG. 9 shows graph illustrating the permalloy loop shift vs. intermediate layer thickness between the permalloy and the magneto-optical medium.
Figure 6:
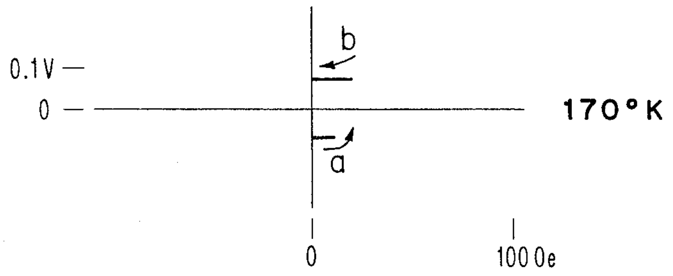
FIG. 6 shows a d.c. hysteresis loop when the permalloy layer of magneto-optical device of this invention is saturated with a positive field at 170° K, i.e., a temperature above the Curie temperature of the magneto-optical medium.

The device of this invention is in contrast to the relationship of the layers 12 and 14 shown in FIG. 6 of the above-mentioned U. S. Pat. No. 3,475,738 in which the principal magnetization vectors of the two layers point in the same direction as a result of parallel or positive exchange coupling therebetween. In such arrangement information recording on the permalloy film is performed at a temperature below the Curie point of the magneto-optical medium. If such a relationship exists then the magnetization vectors would not remain stable for as the ambient temperature approaches room temperatures, the two layers would become affected by the magnetostatic or stray field coupling, an effect which causes the vectors to be anti-parallel, that is, negatively coupled by their stray fields. The stray field from the permalloy is always trying to align the magneto-optical medium magnetization anti-parallel to the permalloy magnetization and although a strong positive exchange coupling would outweigh the stray field coupling at temperatures well below the Curie point of the magneto-optical medium and this will maintain the magnetizations parallel, this would no longer be true at temperatures near the magneto-optical medium Curie point. It is uncertain what the relationship of the two magnetic vectors might be after a temperature variation cycle has been completed. But it is most probable that an anti-parallel rather than a parallel relationship would exist between the two layers. In that event the information stored in the device will have become unreliable as a consequence of the temperature variation, there being no assurance that this data would be restored to its original state merely by bringing the ambient temperature of the device back down to its original level. Hence, information, magnetically stored in a permalloy-europium oxide sandwich memory element of the type advocated by Louis, et al, would be volatile with respect to fluctuating temperature conditions. Whereas information stored in the device of this invention according to the present method, i.e., writing at room temperature, then cooling, is not volatile under fluctuating temperature conditions even though the ambient temperature again rises to room temperature for a prolonged period. This is because negative exchange coupling and stray field coupling both tend to align the two film magnetization's anti-parallel and thus there is no ambiguity in the sign of the net restoring force exerted by the permalloy on the europium oxide as the memory cell is cooled from room temperature to a temperature below the Curie point of europium oxide. Reference is made to FIG. 5 where there is shown a representation of magneto-static or stray field coupling between paramagnetic and ferromagnetic films. It is readily seen that the stray field effect would enhance the negative exchange coupling of the present magneto-optical memory device since the magnetization of the two effects are in the same direction as shown in FIG. 3 wherein such stray field exchange coupling would be opposed to the positive exchange coupling of the prior art shown in FIG. 4.

Figure 7:
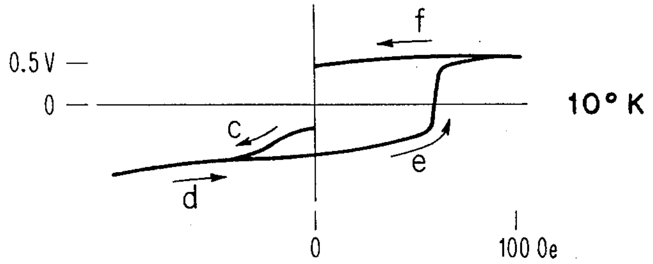
FIG. 7 shows a d.c. hysteresis loop in sequence to that of FIG. 6 when the magneto-optic device is cooled to 10° K and a negative field is applied to cause switching.
Figure 8:
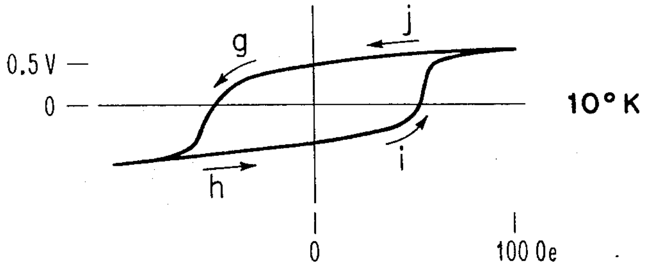
FIG. 8 shows a d.c. hysteresis loop in sequence to that of FIG. 7 when the field is again reversed.

To illustrate that negative exchange coupling exists between the films 12 and 14 of the present invention, reference is now made to FIGS. 6, 7 and 8 which show the d.c. hysteresis loops obtained by the Faraday effect. A sequence of applied fields of about 100 oersteds is applied to the coupled films. The order of applied fields is indicated by arrows *a* – *j* of FIGS. 6, 7, and 8. In FIG. 6 the permalloy layer 12 is saturated with a positive field at 170° K, considerably above the Curie temperature of europium oxide. It is shown that switching occurs at about 5 oersteds. The sample is then cooled to 10° K and a negative field is applied as shown in FIG. 7. It is then seen that the switching signal is small, about twice the amplitude of the high temperature permalloy switching signal. Reversing the field produces a large switching signal which indicates that the europium oxide is about 85 – 90 percent saturated in a direction opposite to the permalloy. Subsequent switching is shown in FIG. 8 where the two films are believed to be switching at least partly by rotating in an opposite sense.

Further evidence of negative exchange coupling between films 12 and 14 is shown in FIG. 9 which illustrates a loop shift versus separation of the film. In this experiment, a sample was prepared having a permalloy film of about 435A. thick and a europium oxide film of about 1,400A. The films were separated by an intermediate dielectric layer ($Eu_2O_3$) with thicknesses between 0 and 44A. The permalloy loop shift at 20° K is + 36 oersteds for no intermediate layer and is reduced to +3 oersteds, i.e., by more than a factor of 10 for a 22A. intermediate layer. The above effect shown can only be explained by the existence of negative exchange coupling.

Figure 2:
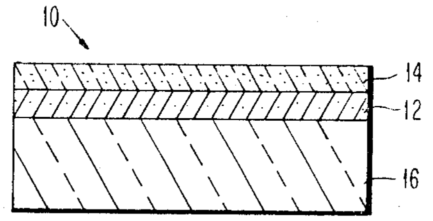
FIG. 2 shows a cross-sectional view of the magneto-optical memory element of this invention.
Figure 1A:
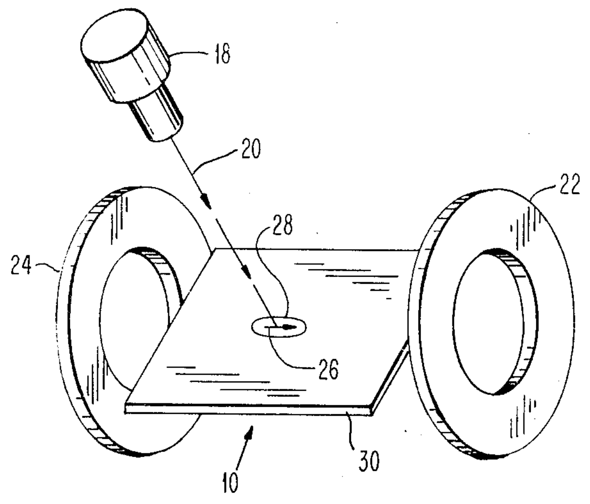
FIG. 1A is a schematic diagram illustrating the writing operation for establishing binary information into magneto-optical memory element in accordance with this invention.
Figure 1B:
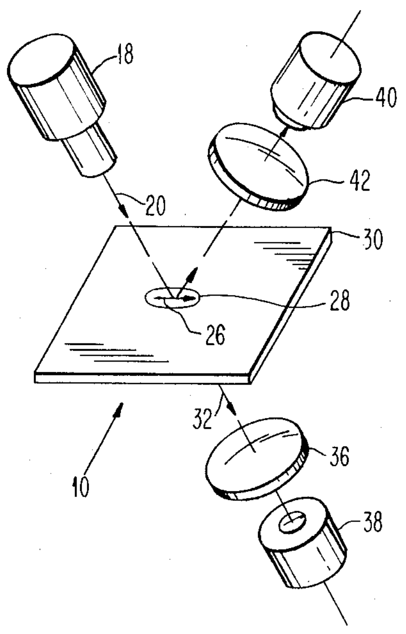
FIG. 1B is a schematic diagram illustrating the reading operation for retrieving information stored as a magnetic orientation via the magneto-optical memory element in accordance with this invention.

A discussion of the reading operation, i.e., for achieving binary information stored in the apparatus 10 as described with FIG. 1B will now be presented with reference to FIG. 1B. In FIG. 1B element 10 prepared in accordance with the practice of this invention has incident on region 28 thereof a focused light beam 20 from light beam source 18, preferably a laser. Conveniently the light beam 20 can be provided by a He-Ne laser emitting light having wavelengths of 6,328A. The region 28 represents information written into the permalloy layer 12 at room temperature.

Several magneto-optic effects are readily available for determining the interaction of the incident light beam 20 with the magnetized region 28. The result of the magnetization 26 therein alters the nature of both reflected light 30 and transmitted light 32 from incident light 20. For measurements of the Faraday rotation the transmitted light 32 is received by multiplier tube 38 via an analyzer 36. The analyzer 36 is set for minimum transmission for a certain direction of the electric field of incident linearly polarized light; and the output of multiplier tube 38 is a measure of the Faraday rotation.

The longitudinal Kerr effect is measured by multiplier tube 40 which provides a measure of the amount of rotation of the polarization after the reflected light 30 from region 28 is passed through the analyzer 42. The transverse effect is measured by the amount of change in the intensity of the reflected light from region 28 as measured by photo-multiplier 40. Reading of the information on element 10 occurs below the Curie point of the magneto-optical medium 14.

In summary, the present invention contemplates the provision of a two layer magneto-optical memory element 10 in which a ferromagnetic storage layer 12 is magnetically negative exchange coupled to a transparent ferromagnetic semiconductor layer 14. As the preferred embodiment of the invention, it is proposed that the storage layer have a thickness of about 450A. units. The magneto-optical medium 14 should have a thickness in the range of about 350A. to about 1,400A. The exchange coupling between two layers such as 12 and 14 should not be appreciably disturbed by magneto-static or stray field coupling.

The present invention also contemplates an improved method of writing information into the two layer magneto-optical memory element 10 at room temperature and subsequently reading information out from the magneto-optical medium 14 at a temperature below the Curie point thereof and wherein said information being read has been transferred from storage layer 12 thereto.

When an europium chalcogenide is used as the medium 14, such material must be maintained at a temperature below its Curie point which is in the cryogenic temperature range during a reading operation. Typical Curie points for such materials are 72° K for EuO, 19° K for EuS, and 7° K for EuSe. If a rare earth doped europium oxide is used as the magneto-optical medium 14, it must be maintained at a temperature in the range of 69° K to about 140° K, when the europium oxide is doped with a transition metal such as iron, cobalt, nickel or chromium the temperature must be maintained in a range of from 69° K to about 180° K.

While the invention has particularly shown and described with reference to a preferred embodiment thereof, it will be understood by those skilled in the art that the foregoing and other changes in form and details may be made therein without departing from the spirit and scope of the invention.

What is claimed is:

1. A method for recording information onto magneto-optical memory element and retrieving said information therefrom comprising the steps of;

a. providing a magneto-optical memory element comprising a substrate;

a first layer of ferromagnetic material capable of assuming a state of remanent magnetization in a given direction substantially parallel to at least one surface thereof, a second layer of ferromagnetic material disposed adjacent to said first layer and capable of assuming a state of remanent magnetization anti-parallel to said remanent magnetization of said first layer as a result of a negative exchange coupled relationship with said first layer, said first and second layers being disposed upon said substrate and at least one of said layers being transparent to permit the passage of a light beam through it to the other layer, b. maintaining said magneto-optical memory element at about room temperature while applying a writing magnetic field in the plane of said memory element to thereby store information in one of said layers, c. cooling said magneto-optical memory below the Curie temperatures of said layers; and d. scanning the surface of said element with a light beam to thereby read the information stored in one of said layers.

2. A method according to claim 1 wherein said second layer is transparent and is a semiconductor material having ferromagnetic properties.

3. A method according to claim 1 wherein said second layer is a rare earth chalcogenide selected from the group consisting of EuO, EuS, EuSe and EuTe.

4. A method according to claim 3 wherein said rare earth chalcogenide is doped with a material selected from the group consisting of a rare earth sesquioxide and Fe, Ni, Co and Cr.

5. A method according to claim 1 wherein said first layer is permalloy.

6. A method according to claim 1 wherein said first layer has a thickness of about 435A. and said second layer has a thickness in the range from about 350A. to about 1,400A.

* * * * *